US012761800B2

(12) United States Patent
Wu

(10) Patent No.: US 12,761,800 B2
(45) Date of Patent: Oct. 13, 2026

(54) LINK STATE CONTROL METHOD AND DATA STORAGE SYSTEM

(71) Applicant: Acer Incorporated, New Taipei City (TW)

(72) Inventor: Hung-Sheng Wu, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 0 days.

(21) Appl. No.: 18/796,328

(22) Filed: Aug. 7, 2024

(65) Prior Publication Data

US 2025/0383777 A1 Dec. 18, 2025

(30) Foreign Application Priority Data

Jun. 17, 2024 (TW) ................................ 113122240

(51) Int. Cl.
*G06F 3/06* (2006.01)

(52) U.S. Cl.
CPC .......... *G06F 3/0613* (2013.01); *G06F 3/0653* (2013.01); *G06F 3/0679* (2013.01)

(58) Field of Classification Search
None
See application file for complete search history.

(56) References Cited

U.S. PATENT DOCUMENTS 10,725,509 B2 * 7/2020 Wang .................. G06F 11/0757
11,017,823 B1 * 5/2021 Kamepalli .............. G06F 1/206
11,120,880 B1 * 9/2021 Wang ...................... G11C 16/16
11,531,473 B1 * 12/2022 Ionin .................... G06F 11/1068
2006/0039108 A1 * 2/2006 Chikusa ..................... G06F 1/20
2006/0161375 A1 * 7/2006 Duberstein ........... G06F 1/3296 702/132
2007/0140030 A1 * 6/2007 Wyatt ....................... G11C 5/00 365/212
2009/0018708 A1 * 1/2009 O'Neil .................. H01L 23/345 700/300
2015/0235706 A1 8/2015 Chu
2016/0037686 A1 * 2/2016 Shabbir ................... G06F 1/206 700/300

(Continued)

FOREIGN PATENT DOCUMENTS

CN 110096233 A * 8/2019 .......... G06F 11/3058
CN 115904772 4/2023

(Continued)

OTHER PUBLICATIONS

Christopher Trick, "What is PCIe (Peripheral Component Interconnect Express)?", Sep. 25, 2023, pp. 1-9, https://www.trentonsystems.com/en-gb/blog/what-is-pcie (Year: 2023).*

(Continued)

*Primary Examiner* — Christopher D Birkhimer
(74) *Attorney, Agent, or Firm* — JCIPRNET

(57) ABSTRACT

A link state control method and a data storage system are provided. The method includes: establishing a connection between a host system and a memory device; detecting a temperature of the memory device through the connection; and setting a link state adopted by the connection to one of a plurality of candidate link states according to the temperature.

10 Claims, 3 Drawing Sheets

21

| Link State | Temperature Range |
|---|---|
| PCIe Gen5 | A5 |
| PCIe Gen4 | A4 |
| PCIe Gen3 | A3 |
| PCIe Gen2 | A2 |
| PCIe Gen1 | A1 |

(56) References Cited

U.S. PATENT DOCUMENTS

| | | | | |
|---|---|---|---|---|
| 2016/0378149 | A1* | 12/2016 | Kam | G06F 1/3225 713/320 |
| 2017/0269653 | A1* | 9/2017 | Shabbir | H05K 7/20727 |
| 2017/0269654 | A1* | 9/2017 | Shabbir | G06F 13/4018 |
| 2017/0318707 | A1* | 11/2017 | Shabbir | H05K 7/20836 |
| 2018/0232021 | A1* | 8/2018 | Perchlik | G06F 1/206 |
| 2019/0179547 | A1* | 6/2019 | Szubbocsev | G06F 13/4234 |
| 2019/0348133 | A1* | 11/2019 | Chen | G11C 11/5642 |
| 2020/0081507 | A1* | 3/2020 | Nowell | G01K 3/005 |
| 2020/0213468 | A1* | 7/2020 | Ito | H04N 1/00034 |
| 2020/0373693 | A1* | 11/2020 | Tsai | H01R 12/55 |
| 2021/0181990 | A1* | 6/2021 | Balb | G06F 3/0679 |
| 2022/0012150 | A1* | 1/2022 | Panse | G06F 11/3058 |
| 2022/0147279 | A1* | 5/2022 | Goss | G06F 3/0679 |
| 2022/0283730 | A1* | 9/2022 | Nam | G06F 3/0655 |
| 2023/0051825 | A1* | 2/2023 | Chang | G06F 3/061 |
| 2023/0062129 | A1* | 3/2023 | Heath | G06F 3/0659 |
| 2023/0066696 | A1* | 3/2023 | Taira | G11C 7/04 |
| 2023/0280716 | A1* | 9/2023 | Kotak | G06F 11/3058 700/300 |
| 2023/0359399 | A1* | 11/2023 | Choi | G06F 3/0605 |
| 2024/0086078 | A1* | 3/2024 | Lim | G06F 3/0634 |

FOREIGN PATENT DOCUMENTS

| | | | | |
|---|---|---|---|---|
| CN | 116880758 | | 10/2023 | |
| DE | 102008054598 | A1 * | 8/2010 | G06F 1/206 |
| ES | 2748596 | T3 * | 3/2020 | G06F 1/206 |
| TW | 202225973 | | 7/2022 | |
| TW | 202331526 | | 8/2023 | |

OTHER PUBLICATIONS

Anonymous, "What is PCIe? Understanding PCIe Slots, Cards and Lanes", Feb. 1, 2024, pp. 1-3, https://web.archive.org/web/20240201193705/https://www.crystalrugged.com/knowledge/what-is-pcie-slots-cards-lanes/ (Year: 2024).*

Lenovo, "NVMe SSD tranmission mode dynamically changes with AMD new PSPP (PCIE Speed Power Policy) design", Sep. 22, 2022, pp. 1-4, https://support.lenovo.com/us/en/solutions/ht510080-nvme-ssd-transmission-mode-dynamically-changes-with-amd-new-pspp-pcie-speed-power-policy-design#Symptom_HT (Year: 2022).*

Hassan Mujtaba, "Phison Reiterates High Temperatures for PCIe Gen 5 NVMe SSDs, Up to 125C Limit for Controller & Active Cooling Requirement", Mar. 22, 2022, pp. 1-14, https://wccftech.com/phison-reiterates-high-temperatures-for-pcie-gen-5-nvme-ssds-up-to-120c-limit-for-controller-active-cooling-r (Year: 2022).*

* cited by examiner

21

| Link State | Temperature Range |
|---|---|
| PCIe Gen5 | A5 |
| PCIe Gen4 | A4 |
| PCIe Gen3 | A3 |
| PCIe Gen2 | A2 |
| PCIe Gen1 | A1 |

LINK STATE CONTROL METHOD AND DATA STORAGE SYSTEM

CROSS-REFERENCE TO RELATED APPLICATION

This application claims the priority benefit of Taiwan application serial no. 113122240, filed on Jun. 17, 2024. The entirety of the above-mentioned patent application is hereby incorporated by reference herein and made a part of this specification.

BACKGROUND

Technical Field

The disclosure relates to a link state control method and a data storage system.

Description of Related Art

With the advancement of technology, the data transmission speed between host systems and memory devices continues to grow. For instance, if the connection between a host system and a memory device adopts the fifth generation (Gen 5) of the high-speed peripheral component interconnect express (PCI Express, PCIe) (PCIe Gen 5) standard, the transmission speed between the host system and the memory device can theoretically reach 32 gigabytes (GB) per second. However, correspondingly, as the data transmission speed grows, the temperature of the memory device will also increase significantly. Once the temperature of the memory device exceeds the tolerable temperature, data access errors inside the memory device are likely to occur, and electronic components may be damaged. Therefore, how to strike a balance between the temperature of the memory device and the data transmission speed is an important issue.

SUMMARY

The disclosure provides a link state control method and a data storage system capable of striking an improved balance between a temperature of the memory device and a data transmission speed.

An embodiment of the disclosure provides a link state control method for a host system connected to a memory device, and the link state control method includes the following steps. A connection between the host system and the memory device is established. A temperature of the memory device is detected through the connection. According to the temperature, a link state adopted by the connection is set to one of a plurality of candidate link states.

An embodiment of the disclosure further provides a data storage system including a host system and a memory device. The memory device is connected to the host system. The host system is configured to establish a connection between the host system and the memory device, detect a temperature of the memory device through the connection, and set a link state adopted by the connection to one of a plurality of candidate link states according to the temperature.

Based on the above, after establishing the connection between the host system and the memory device, the host system detects the temperature of the memory device through the connection. Next, the host system sets the link state adopted by the connection to one of the plurality of candidate link states according to the detected temperature.

In this way, the data transmission speed between the host system and the memory device is effectively improved while taking into account the temperature control of the memory device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figures 1, 2:
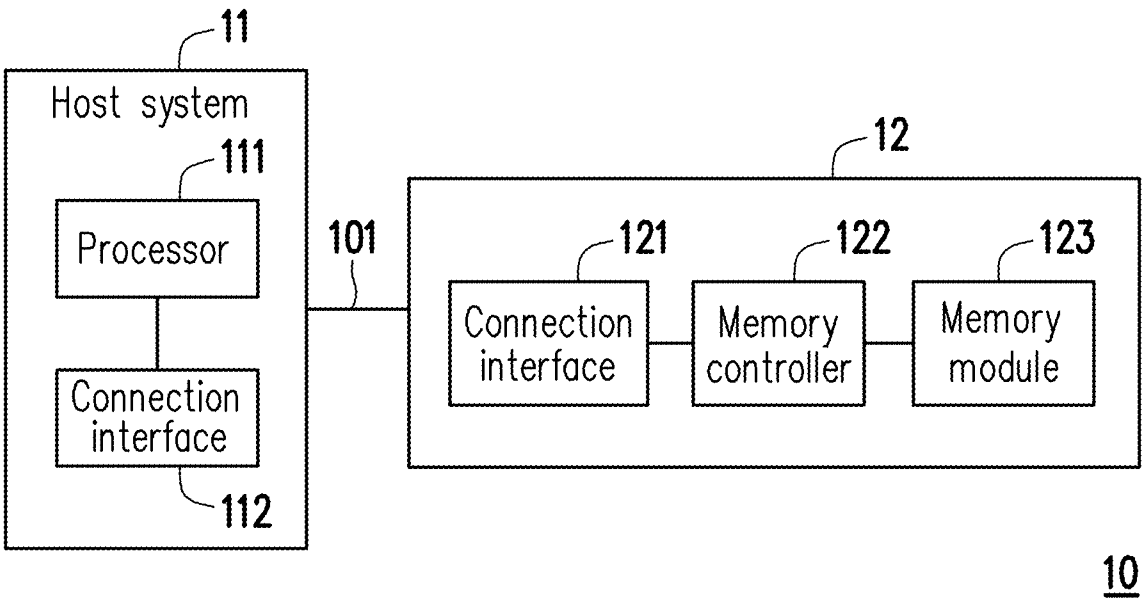
FIG. 1 is a schematic view illustrating a data storage system according to an embodiment of the disclosure.
FIG. 2 is a schematic table illustrating a corresponding relationship between a link state and a temperature range according to an embodiment of the disclosure.

FIG. 1 is a schematic view illustrating a data storage system according to an embodiment of the disclosure. With reference to FIG. 1, a data storage system 10 includes a host system 11 and a memory device 12. The host system 11 may store data in the memory device 12 or read data from the memory device 12. The host system 11 may be an electronic device such as a smart phone, a tablet computer, a laptop computer, a desktop computer, an industrial computer, a server, a game console, or a vehicle-mounted computer. The memory device 12 may be a non-volatile memory device such as a flash drive, a memory card, a solid state drive (SSD), a secure digital (SD) card, a compact flash (CF) card, or an embedded storage device.

The host system 11 includes a processor 111 and a connection interface 112. The processor 111 is used to control the overall or partial operation of the host system 11. For instance, the processor 111 may include a central processing unit (CPU), a graphic processing unit (GPU), a neural network processing unit (NPU), a programmable microprocessor for general or special use, a digital signal processor (DSP), a programmable controller, an application specific integrated circuit (ASIC), a programmable logic device (PLD), other similar devices, or a combination of the foregoing devices.

The connection interface 112 is connected to the processor 111. The connection interface 112 is used to transmit data to the memory device 12 or receive data from the memory device 12. In an embodiment, the host system 11 may also include any practically required hardware devices, such as a battery unit, a network interface card, a mouse, a keyboard (or a touch pad), a screen, and/or a speaker, etc.

The memory device 12 includes a connection interface 121, a memory controller 122, and a memory module 123. The connection interface 121 is used to be connected to the host system 11. For instance, the connection interface 121 may communicate with the host system 11 via the connection interface 112 of the host system 11. For instance, the connection interfaces 112 and 121 may comply with the high-speed peripheral component interconnect express (PCI Express) standard. In an embodiment, the connection interfaces 112 and 121 may also comply with various connection interface standards such as the serial advanced technology attachment (SATA), parallel advanced technology attachment (PATA), or universal serial bus (USB) standards.

The memory controller 122 is connected to the connection interface 121 and the memory module 123. The memory controller 122 is used to control the overall operation of the memory device 12. For instance, the memory controller 122 may perform operations such as writing, reading, and erasing data in the memory module 123 according to an instruction of the host system 11. In an embodiment, the memory controller 122 is also referred to as a flash memory controller.

The memory module 123 is used to store data written by the host system 11. For instance, the memory module 123 may include a single level cell (SLC) NAND flash memory module, a multi level cell (MLC) NAND flash memory module, a triple level cell (TLC) NAND flash memory module, a quad level cell (QLC) NAND flash memory module, and/or other types of non-volatile memory modules.

In an embodiment, the processor 111 may establish a connection 101 between the host system 11 and the memory device 12. For instance, the processor 111 may perform a handshake operation with the connection interface 121 of the memory device 12 through the connection interface 112 to establish the connection 101 between the host system 11 and the memory device 12.

In an embodiment, in the handshake operation, the processor 111 may select one of a plurality of candidate link states as a link state (also referred to as an initial link state) adopted by the connection 101 based on a maximum data transmission speed supported by the host system 11 and a maximum data transmission speed supported by the memory device 12. For instance, a transmission speed upper limit corresponding to this initial link state is required to be lower than the maximum data transmission speeds supported by the host system 11 as well as the memory device 12. In this way, problems in subsequent data transmission between the host system 11 and the memory device 12 via the connection 101 may be avoided.

In an embodiment, taking the high-speed peripheral component interconnect express standard as an example, the plurality of candidate link states may include PCIe Gen 1 to PCIe Gen 5. The processor 111 may select one of the candidate link states as the initial link state adopted by the connection 101. In an embodiment, the plurality of candidate link states may also vary according to different types of connection interface standards adopted by the connection 101, and the disclosure is not limited thereto.

In an embodiment, after establishing the connection 101, the processor 111 may detect a temperature of the memory device 12 through the connection 101. For instance, the processor 111 may send a request (also referred to as a temperature query request) to the memory device 12 via the connection 10 to inquire about the temperature of the memory device 12. The memory controller 122 may read temperature information sensed by a temperature sensor (not shown) inside the memory device 12 according to the request. The temperature information may reflect the temperature of the memory device 12. Next, the memory controller 122 may transmit the temperature information to the host system 11 via the connection 101. The processor 111 may obtain the temperature of the memory device 12 according to the temperature information.

In an embodiment, after obtaining the temperature of the memory device 12, the processor 111 may reset the link state used by the connection 101 to one of the plurality of candidate link states according to the temperature. In this way, a data transmission speed between the host system 11 and the memory device 12 may be effectively improved while taking into account the temperature control of the memory device 12.

In an embodiment, the processor 111 may determine whether the temperature of the memory device 12 falls within a specific temperature range (also referred to as a target temperature range) among a plurality of candidate temperature ranges. Each candidate temperature range covers one temperature range, and the temperature ranges covered by any two candidate temperature ranges may not overlap at all or may overlap partially. The disclosure is not limited thereto.

In an embodiment, in response to the temperature of the memory device 12 falling within the target temperature range, the processor 111 may set the link state adopted by the connection 101 to a link state (also referred to as a target link state) among the plurality of candidate link states that corresponds to the target temperature range. For instance, assuming that the link state currently adopted by the connection 101 is the aforementioned initial link state, in response to the temperature of the memory device 12 falling within the target temperature range, the processor 111 may switch the link state adopted by the connection 101 from the initial link state to the target link state.

FIG. 2 is a schematic table illustrating a corresponding relationship between a link state and a temperature range according to an embodiment of the disclosure. With reference to FIG. 2, in an embodiment, the processor 111 may record a corresponding relationship between a plurality of candidate link states (e.g., PCIe Gen 1 to PCIe Gen 5) and a plurality of temperature ranges (A1 to A5) in a data table 21. After obtaining the temperature of the memory device 12, the processor 111 may query the data table 21 according to the temperature of the memory device 12 to obtain the target link state. For instance, assuming that the temperature of the memory device 12 falls within the temperature range A4, the processor 111 may determine the temperature range A4 as the target temperature range. Next, according to the data table 21, the processor 111 may determine the link state (i.e., PCIe Gen 4) corresponding to the temperature range A4 (i.e., the target temperature range) as the target link state. After that, the processor 111 may set the link state adopted by the connection 101 to PCIe Gen 4 (i.e., the target link state). By analogy, according to the temperature of the memory device 12 and the data table 21, the processor 111 may set the link state adopted by the connection 101 to one of PCIe Gen 1 to PCIe Gen 5 (i.e., the plurality of candidate link states).

In an embodiment, after setting the link state adopted by the connection 101 to one of the plurality of candidate link states (also referred to as a first link state), when the connection 101 adopts the first link state, the processor 111 may determine whether the temperature of the memory device 12 is higher than (or not lower than) a temperature upper limit (also referred to as a first temperature upper limit) corresponding to the first link state or lower than a temperature lower limit (also referred to as a first temperature lower limit) corresponding to the first link state. The first temperature upper limit is higher than the first temperature lower limit. For instance, the first link state may be the aforementioned initial link state or the target link state.

In an embodiment, in response to the temperature of the memory device 12 being higher than the first temperature upper limit corresponding to the first link state, the processor 111 may reset the link state adopted by the connection 101 to another link state (also referred to as a second link state) among the plurality of candidate link states. In particular, a transmission speed upper limit (also referred to as a first transmission speed upper limit) corresponding to the first link state may be higher than a transmission speed upper limit (also referred to as a second transmission speed upper limit) corresponding to the second link state.

In an embodiment, after the link state adopted by the connection 101 is switched from the first link state to the second link state, a data transmission speed upper limit between the host system 11 and the memory device 12 based on the connection 101 may decrease. Therefore, in an embodiment, by switching the link state adopted by the connection 101 from the first link state to the second link state, the processor 111 may effectively assist the memory device 12 in cooling down at the possible expense of slightly sacrificing the data transmission speed between the host system 11 and the memory device 12.

In an embodiment, in response to the temperature of the memory device 12 being lower (or not higher than) than the first temperature lower limit corresponding to the first link state, the processor 111 may reset the link state adopted by the connection 101 to still another link state (also referred to as a third link state) among the plurality of candidate link states. In particular, a transmission speed upper limit (also referred to as a third transmission speed upper limit) corresponding to the third link state may be higher than the transmission speed upper limit (i.e., the first transmission speed upper limit) corresponding to the first link state.

In an embodiment, after the link state adopted by the connection 101 is switched from the first link state to the third link state, the data transmission speed upper limit between the host system 11 and the memory device 12 based on the connection 101 may increase. Therefore, in an embodiment, by switching the link state adopted by the connection 101 from the first link state to the third link state, the processor 111 may effectively increase the data transmission speed (or data transmission efficiency) between the host system 11 and the memory device 12 while taking into account the temperature control of the memory device 12.

Figure 3:
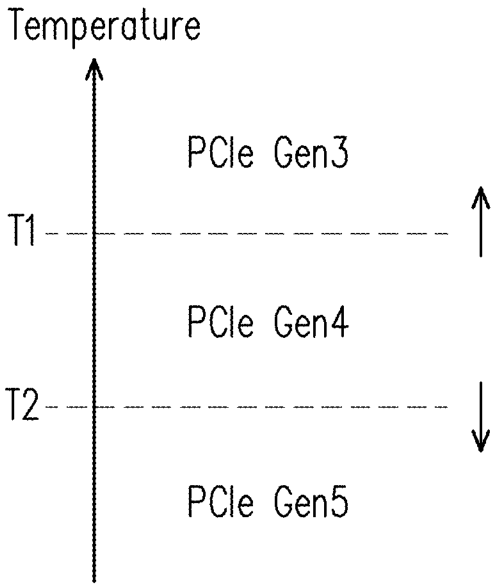
FIG. 3 is a schematic graph illustrating adjustment of the link state adopted by a connection according to a temperature of a memory device according to an embodiment of the disclosure.

FIG. 3 is a schematic graph illustrating adjustment of the link state adopted by a connection according to a temperature of a memory device according to an embodiment of the disclosure. With reference to FIG. 3, in an embodiment, assuming that the link state currently adopted by the connection 101 is PCIe Gen 4 (i.e., the first link state). In an embodiment, when it is detected that the temperature of the memory device 12 is higher than a temperature threshold T1 (i.e., the first temperature upper limit), the processor 111 may reset (or switch) the link state adopted by the connection 101 to PCIe Gen 3 (i.e., the second link state). In an embodiment, by switching the link state adopted by the connection 101 from PCIe Gen 4 to PCIe Gen 3, the processor 111 may effectively assist the memory device 12 in cooling down at the possible expense of slightly sacrificing the data transmission speed between the host system 11 and the memory device 12.

On the other hand, in an embodiment, when it is detected that the temperature of the memory device 12 is lower than a temperature threshold T2 (i.e., the first temperature lower limit), the processor 111 may reset (or switch) the link state adopted by the connection 101 to PCIe Gen 5 (i.e., the third link state). In an embodiment, by switching the link state adopted by the connection 101 from PCIe Gen 4 to PCIe Gen 5, the processor 111 may effectively increase the data transmission speed between the host system 11 and the memory device 12 while taking into account the temperature control of the memory device 12.

However, in an embodiment, if the temperature of the memory device 12 continues to be maintained between the temperature thresholds T1 and T2, the processor 111 may maintain the link state adopted by the connection 101 as PCIe Gen 4 (i.e., the first link state). In this way, the link state adopted by the connection 101 may be prevented from being excessively and frequently adjusted, and that unnecessary power consumption or unnecessary waste of system resources is prevented from being generated.

It should be noted that although “PCIe Gen 4”, “PCIe Gen 3”, and “PCIe Gen 5” are used as examples of the first link state, the second link state, and the third link state respectively in FIG. 3, the disclosure is not limited thereto. In another embodiment, the first link state, the second link state, and the third link state may be adjusted according to practical needs, and the disclosure is not limited thereto.

Figure 4:
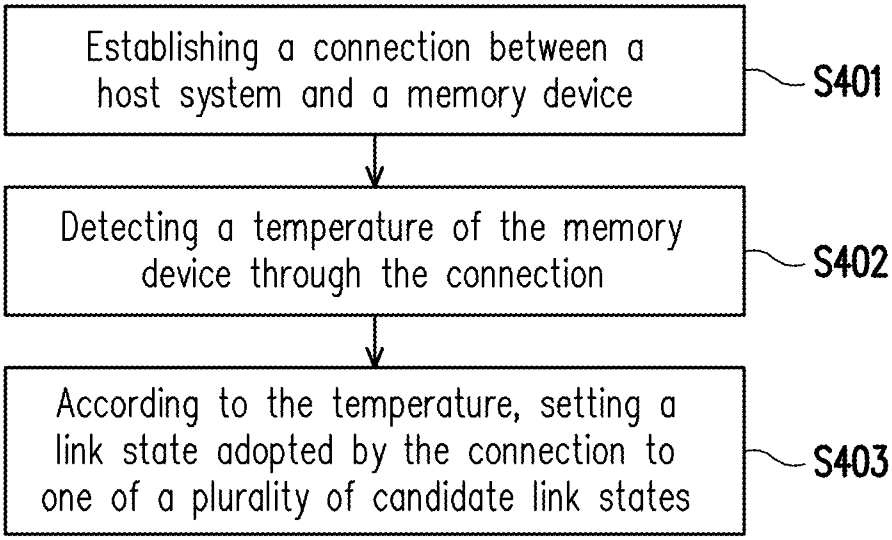
FIG. 4 is a flow chart illustrating a link state control method according to an embodiment of the disclosure.

FIG. 4 is a flow chart illustrating a link state control method according to an embodiment of the disclosure. With reference to FIG. 4, in step S401, a connection between a host system and a memory device is established. In step S402, a temperature of the memory device is detected through the connection. In step S403, according to the temperature, a link state adopted by the connection is set to one of a plurality of candidate link states.

Figure 5:
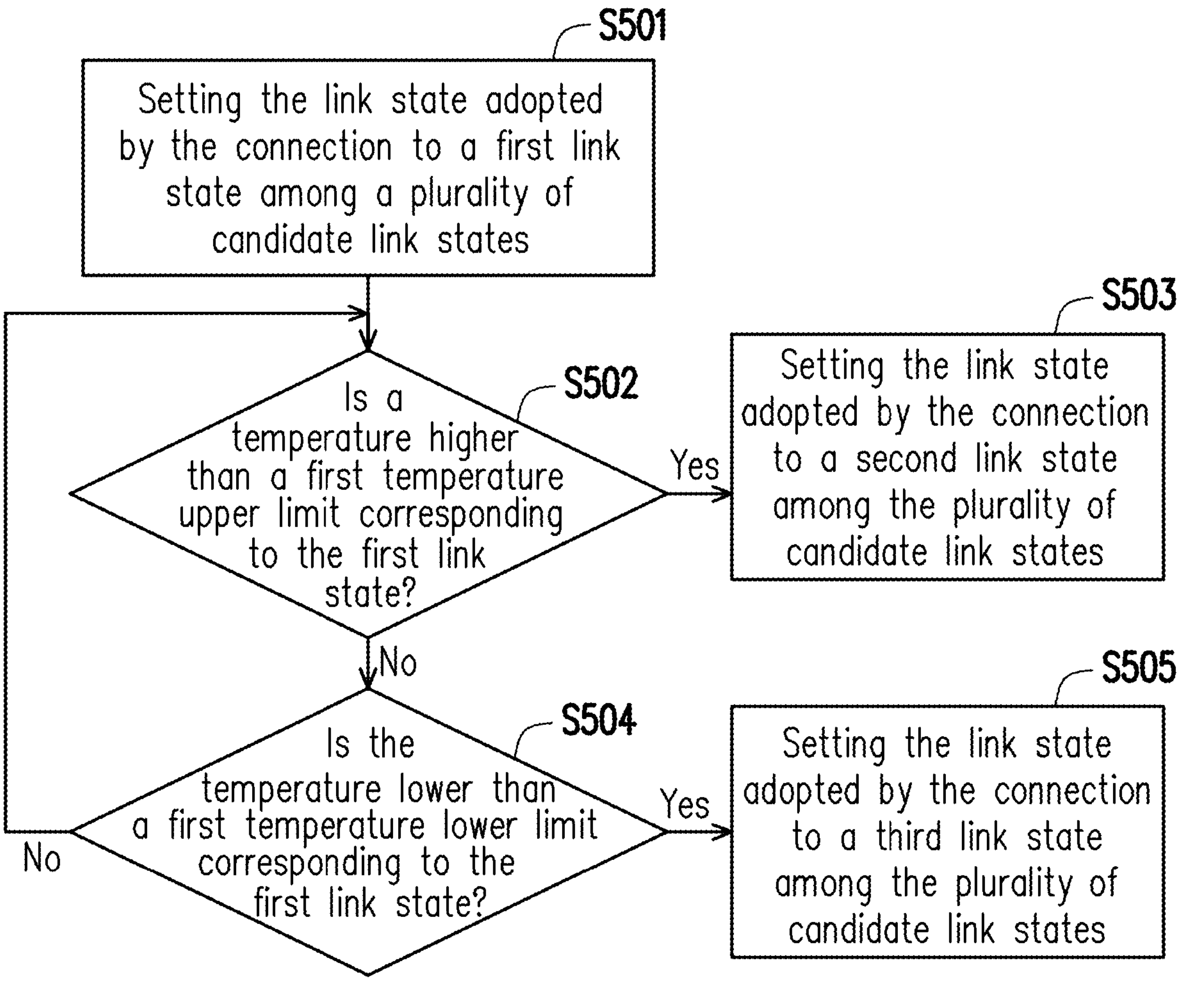
FIG. 5 is a flow chart illustrating a link state control method according to an embodiment of the disclosure.

FIG. 5 is a flow chart illustrating a link state control method according to an embodiment of the disclosure. With reference to FIG. 5, in step S501, a link state adopted by a connection between a host system and a memory device is set to a first link state among a plurality of candidate link states. In step S502, when the connection adopts the first link state, it is determined whether a temperature of the memory device is higher than a first temperature upper limit corresponding to the first link state. In response to the temperature of the memory device being higher than the first temperature upper limit corresponding to the first link state, in step S503, the link state adopted by the connection is set to a second link state among the plurality of candidate link states.

If the temperature of the memory device is not higher than the first temperature upper limit corresponding to the first link state, in step S504, it is determined whether the temperature of the memory device is lower than a first temperature lower limit corresponding to the first link state. In response to the temperature of the memory device being lower than the first temperature lower limit corresponding to the first link state, in step S505, the link state adopted by the connection is set to a third link state among the plurality of candidate link states. Further, if the temperature of the memory device is neither higher than the first temperature upper limit corresponding to the first link state nor lower than the first temperature lower limit corresponding to the first link state, the link state adopted by the connection may not be adjusted temporarily, and the process may return to step S502.

The steps in FIG. 4 and FIG. 5 are described in detail in the above paragraphs, and description thereof is not repeated herein. It should be noted that each step of FIG. 4 and FIG. 5 may be implemented as a plurality of program codes or circuits, which is not limited by the disclosure. In addition, the method of FIG. 4 and FIG. 5 may be used in combination with the abovementioned exemplary embodiments or be solely used, which is not limited by the disclosure.

In view of the foregoing, in the link state control method and the data storage system provided by the embodiments of the disclosure, an improved balance may be achieved between the temperature of the memory device and the data transmission speed. In particular, by obtaining the temperature of the memory device in real time and adjusting the link state adopted by the connection between the host system and the memory device according to the temperature of the memory device, in the link state control method and the data storage system provided by the embodiments of the disclosure, the data transmission speed between the host system and the memory device may be effectively improved while taking into account the temperature control of the memory device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A link state control method for a host system connected to a memory device, the link state control method comprising:

establishing a mapping between a plurality of candidate link states and a plurality of temperature ranges, wherein the mapping reflects the candidate link states corresponding to temperature ranges respectively, and the candidate link states comprises at least two of Gen 1 to Gen 5 of high-speed peripheral component interconnect express standard;

establishing a connection between the host system and the memory device;

detecting a temperature of the memory device through the connection and determining a target temperature range comprising the temperature from the temperature ranges;

determining a target link state corresponding to the target temperature range from the candidate link state according to the mapping; and setting a link state adopted by the connection to be the target link state.

2. The link state control method according to claim 1, wherein the step of determining the target temperature range comprises:

determining whether the temperature falls within one of the candidate temperature ranges; and in response to the temperature falling within the one of the candidate temperature ranges, determining the one of the candidate temperature ranges to be the target temperature range.

3. The link state control method according to claim 1, wherein the step of setting the link state adopted by the connection to be the target link state comprises:

setting the link state adopted by the connection to a first link state among the candidate link states;

when the connection adopts the first link state, determining whether the temperature is higher than a first temperature upper limit corresponding to the first link state or lower than a first temperature lower limit corresponding to the first link state;

in response to the temperature being higher than the first temperature upper limit corresponding to the first link state, setting the link state adopted by the connection to a second link state among the candidate link states; and in response to the temperature being lower than the first temperature lower limit corresponding to the first link state, setting the link state adopted by the connection to a third link state among the candidate link states.

4. The link state control method according to claim 3, wherein a third transmission speed upper limit corresponding to the third link state is higher than a first transmission speed upper limit corresponding to the first link state, and the first transmission speed upper limit corresponding to the first link state is higher than a second transmission speed upper limit corresponding to the second link state.

5. The link state control method according to claim 1, wherein the connection complies with the high-speed peripheral component interconnect express standard.

6. A data storage system, comprising:

a host system; and a memory device connected to the host system, wherein the host system is configured to:

establishing a mapping between a plurality of candidate link states and a plurality of temperature ranges, wherein the mapping reflects the candidate link states corresponding to temperature ranges respectively, and the candidate link states comprises at least two of Gen 1 to Gen 5 of high-speed peripheral component interconnect express standard;

establish a connection between the host system and the memory device, detect a temperature of the memory device through the connection and determine a target temperature range comprising the temperature from the temperature ranges, determine a target link state corresponding to the target temperature range from the candidate link state according to the mapping, and set a link state adopted by the connection to be the target link state .

7. The data storage system according to claim 6, wherein the operation of determining the target temperature range comprises:

determining whether the temperature falls within one of the candidate temperature ranges; and in response to the temperature falling within the one of the candidate temperature ranges, determining the one of the candidate temperature ranges to be the target temperature range.

8. The data storage system according to claim 6, wherein the operation of setting the link state adopted by the connection to be the target link state comprises:

setting the link state adopted by the connection to a first link state among the candidate link states;

when the connection adopts the first link state, determining whether the temperature is higher than a first temperature upper limit corresponding to the first link state or lower than a first temperature lower limit corresponding to the first link state;

in response to the temperature being higher than the first temperature upper limit corresponding to the first link state, setting the link state adopted by the connection to a second link state among the candidate link states; and in response to the temperature being lower than the first temperature lower limit corresponding to the first link state, setting the link state adopted by the connection to a third link state among the candidate link states.

9. The data storage system according to claim 8, wherein a third transmission speed upper limit corresponding to the third link state is higher than a first transmission speed upper limit corresponding to the first link state, and the first transmission speed upper limit corresponding to the first link state is higher than a second transmission speed upper limit corresponding to the second link state.

10. The data storage system according to claim 6, wherein the connection complies with the high-speed peripheral component interconnect express standard.

* * * * *